July 1, 1958     C. B. SHIELDS     2,841,757
ELECTRICAL REGULATOR
Filed Jan. 24, 1956
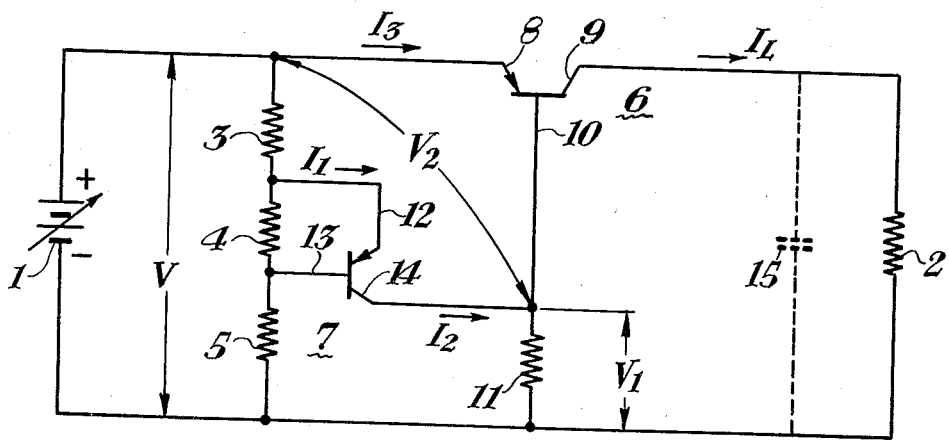
INVENTOR.
Charles B. Shields.
BY W. L. Stout.
HIS ATTORNEY

United States Patent Office 2,841,757
Patented July 1, 1958

2,841,757

ELECTRICAL REGULATOR

Charles B. Shields, Penn Township, Allegheny County, Pa., assignor to Westinghouse Air Brake Company, Wilmerding, Pa., a corporation of Pennsylvania Application January 24, 1956, Serial No. 560,986

6 Claims. (Cl. 323—4)

My invention relates to an electrical regulator and more particularly to apparatus employing semiconductor devices for regulating the current flowing in an electrical network.

In a variety of electrical circuits and particularly those involving low direct current voltage supplies, it is desirable to regulate the current flowing through a load circuit so that fluctuations in the supply voltage will not affect the operation of equipment operated therefrom. Devices that have been used heretofore, such as ballast tubes and the like, for regulating current flow are not suitable for circuits employing low direct current voltages, such as transistor circuits. Also, approximately a third to half of the supply voltage is consumed by these regulating devices, and a relatively large amount of power is required for their operation. Obviously, such devices are inefficient and uneconomical.

Accordingly, an object of my invention is to provide a means for regulating the current flowing to a load circuit, supplied from a source of electrical energy.

Another object of my invention is to provide a regulating means suitable for use in low voltage circuits to regulate the flow of current.

Another object of my invention is to provide a regulating means for controlling the current flowing to a load circuit from a source of supply voltage and which means consumes only a small part of the supply voltage for its operation.

In an illustrative embodiment of my invention, a regulator comprising a first transistor is provided with an input circuit connected to a voltage supply source and with an output circuit connected to a load circuit. A second transistor is provided with an input circuit connected through a voltage divider network to the voltage source and with an output circuit connected in shunt with a portion of the output circuit of the first transistor. This arrangement provides substantially constant collector electrode current in the first transistor and, accordingly, substantially constant load circuit current.

Other objects of my invention will appear hereinafter as the characteristic features of the construction and mode of operation of apparatus embodying my invention are described in detail.

I shall describe one form of apparatus embodying my invention, and shall then point out the novel features thereof in claims.

The accompanying drawing is a diagrammatic view showing one form of regulating apparatus embodying my invention used to regulate the current flowing through a load circuit.

Referring to the drawing a source of variable voltage, here shown as a battery 1, supplies power to a load circuit which, for the purpose of simplicity, is here shown as a resistance 2. It is desired to regulate the current flowing through the load circuit to prevent voltage fluctuations of the supply source from affecting the current flowing through the load circuit.

Interposed between the voltage supply source and the load circuit is my regulating apparatus. The regulating apparatus comprises two semiconductor devices, here shown as two transistors 6 and 7 of the P-N-P variety. Transistor 6 is provided with an emitter electrode 8 which is connected to the positive terminal of the voltage supply source, a collector electrode 9 connected to one terminal of the load circuit, and a base electrode 10 connected through a resistor 11 to the negative terminal of the supply source and to a second terminal of the load circuit.

A voltage divider network consisting of three series connected resistors 3, 4 and 5 is connected across the voltage supply source. The second transistor 7 is provided with an emitter electrode 12 which is connected to the junction of resistors 3 and 4 and a base electrode 13 which is connected to the junction of resistors 4 and 5. The collector electrode is connected to the junction of the base electrode of the first transistor and resistor 11. As the collector current is proportional to the emitter current, it will, accordingly, be proportional to the voltage of the supply source.

Having thus described the physical arrangement of my regulating apparatus, I will now describe its mode of operation. For this purpose, let it be assumed that the voltage of the supply source is fixed at a value of V volts and that a current flows through the voltage divider circuit consisting of resistors 3, 4 and 5. The voltage developed across resistor 4 provides a bias voltage between the emitter and base electrodes of transistor 7. This bias voltage causes an emitter current $I_1$ to flow through the emitter circuit. The emitter current produces a collector current $I_2$ which flows through resistor 11 and develops a voltage $V_1$.

A voltage $V_2$, which is the algebraic difference between V and $V_1$ is developed between the emitter and base electrodes of transistor 6. This provides a bias voltage for this transistor and produces an emitter current $I_3$, which in turn causes a collector current $I_L$ to flow through the collector circuit, which includes the load circuit.

For the purpose of providing an understanding of the regulating action, let it be assumed that the supply voltage V increases. The increased supply voltage increases the emitter current $I_1$ of transistor 7 and in turn the collector current $I_2$. The increased collector current establishes a larger voltage $V_1$ across resistor 11. Since the bias voltage $V_2$ of transistor 6 is now the algebraic difference between the increased supply voltage and the increased voltage $V_1$, it may assume any one of three possible values depending upon the circuit parameters. It may either increase in magnitude, decrease in magnitude or remain unchanged. By proper choice of circuit parameters the resultant bias voltage for transistor 6 may be such as to sustain a constant collector current and thereby regulate the load current.

The voltage developed across resistor 11 provides the collector to base voltage for transistor 6. Although this voltage increases whenever the supply voltage increases, it has little effect upon the collector electrode current. That is to say, a given value of emitter current and a given value of collector voltage, above a predetermined low value, will provide substantially constant collector current for a wide range of collector voltages.

While I have described the manner in which my apparatus will supply substantially constant current to a load circuit, it will be obvious to those skilled in the art that the circuit parameters may be changed slightly to provide either an increase or a decrease in the load circuit current for an increase in the supply voltage.

Obviously, a reduction in the supply voltage will initiate a sequence of actions which are the inverse of those initiated by an increased supply voltage. If the circuit parameters are chosen so as to provide substantially constant load circuit current with an increase in supply voltage, then substantially constant load circuit current will flow when the supply voltage decreases. Obviously, as in other types of regulators, regulation can be provided only for supply voltage fluctuations within certain limits.

In the case of a load circuit which varies periodically such, for example, as a coding device or an oscillator, it may be desirable to provide additional voltage regulation to the load circuit. This may be achieved by providing a capacitor which is connected across the load circuit as shown by dotted capacitor 15 When employed, this capacitor will increase the effectiveness of my regulating means.

While I have here shown and described the operation of my invention as it would occur with transistors of the P–N–P variety, it will be apparent to those skilled in the art that transistors of the N–P–N variety may be employed to provide similar regulation. In fact, transistors of the N–P–N variety may be employed to operate equivalently by merely reversing the polarity of the voltage supply source 1.

Having thus described my invention, what I claim is:

1. In combination with a source of direct current energy, a control circuit for regulating the current flowing in a load circuit comprising a first transistor provided with an output circuit connected to said load circuit and an input circuit connected to said source of energy, a voltage dividing network connected across said source of energy, and a second transistor provided with an input circuit connected to said network and an output circuit connected across a portion of the output circuit of said first transistor.

2. In combination with a source of direct current energy and a load circuit, means for regulating the load current comprising a first transistor provided with an output circuit connected to said load circuit and an input circuit connected to said source of energy, a voltage dividing network connected across said source of energy, a second transistor provided with an input circuit connected to said network and an output circuit resistively coupled to the input and output circuits of said first transistor.

3. In combination with a source of direct current energy and a load circuit, means for controlling the current flowing through said load circuit comprising a first transistor provided with a emitter electrode connected to one terminal of said supply source and a collector electrode connected through said load circuit to a second terminal of said supply source and a base electrode resistively coupled to the second terminal of said source, a voltage dividing network connected across said source, a second transistor provided with an input circuit connected across a part of said network and a collector electrode connected to the base electrode of said first transistor.

4. Means for regulating the current flowing in a load circuit supplied from a source of direct current energy comprising a first transistor provided with an output circuit connected to said load circuit and an input circuit connected to said source of energy, a second transistor provided with an input circuit and an output circuit, a first resistive means connecting the input circuit of said second transistor to said source of energy, and a second resistive means conductively coupled to the output circuit of the second transistor and to the input and output circuits of the first transistor.

5. In combination with a source of direct current energy and a load circuit, means for regulating the current flowing through said load circuit comprising a first transistor having an emitter electrode connected to one terminal of said source of energy and a collector electorde connected to one terminal of said load circuit, resistive means connecting a base electrode of said first transistor to a second terminal of said load circuit and to a second terminal of said source of energy, a voltage dividing network connected across said source of energy, and a second transistor provided with an emitter electrode and a base electrode connected to points of different potential on said network and a collector electrode connected to the base electrode of said first transistor.

6. In combination with a source of direct current energy, a control circuit for regulating the current flowing in a load circuit comprising a first transistor provided with an output circuit connected to said load circuit and an input circuit connected to said source of energy, a capacitor connected in shunt with said load circuit, a voltage dividing network connected across said source of energy, and a second transistor having an input circuit connected to points of different potential on said network and an output circuit connected in shunt with a portion of the output circuit of said first transistor.

References Cited in the file of this patent

UNITED STATES PATENTS

| | | |
|---|---|---|
| 2,268,790 | White et al. | Jan. 6, 1942 |
| 2,535,355 | Froman | Dec. 26, 1950 |
| 2,575,107 | Hobbs et al. | Nov. 13, 1951 |
| 2,690,535 | Douma et al. | Sept. 28, 1954 |
| 2,693,568 | Chase | Nov. 2, 1954 |
| 2,698,416 | Sherr | Dec. 28, 1954 |